United States Patent

[11] 3,571,896

| [72] | Inventor | James E. Wilkerson |
| --- | --- | --- |
| | | Tyler, Tex. |
| [21] | Appl. No. | 780,630 |
| [22] | Filed | Dec. 3, 1968 |
| [45] | Patented | Mar. 23, 1971 |
| [73] | Assignee | Tyler Pipe Industries, Inc. |
| | | Tyler, Tex. |

[54] PIPE JOINT MAKE-OR-BREAK TOOL
4 Claims, 10 Drawing Figs.

[52] U.S. Cl. .................................................... 29/237
[51] Int. Cl. .............................................. B23p 19/04
[50] Field of Search .......................................... 29/237

[56] References Cited
UNITED STATES PATENTS

| 2,958,125 | 11/1960 | Nichols | 29/237 |
| 3,096,572 | 7/1963 | Simmons | 29/237 |
| 3,483,607 | 12/1969 | Madden | 29/237 |
| 3,494,016 | 2/1970 | Evans | 29/237 |

*Primary Examiner*—Travis S. McGehee
*Attorney*—Ralph R. Browning

ABSTRACT: A make-or-break tool for making or breaking the joint between two sections of pipe in which the joint is of the character customarily termed a bell-and-spigot joint or simply a bell-type pipe joint, in which there are two spaced yokes that straddle the pipe and the yoke lever which is pivotally connected to one of the two spaced yokes and linked to the other so that operation of the lever on the axis perpendicular to the axes of the yokes to move the yokes longitudinally of their own axes relative to one another. The linking means is made adjustable so that the tool is applicable both to those situations requiring a long span between yokes at the initiation of operation and those requiring a very close relationship between yokes at such initiation. One of the links is made so that it may act as a yoke itself, being connected to the yoke lever on opposite sides of a pipe and extending across the pipe, which makes it possible to operate within an extremely short axial distance between yokes. Also, the yoke to which the yoke lever is linked is provided with a curved surface on one side to engage a curve on a fitting such as an elbow or a T and the flat surface on the other side to engage a flat surface on such fitting, and being reversible so that the surface desired may be presented in the direction desired. It is also provided with a means for mounting a pin that extends across the yoke to engage an abutment such as is molded onto the outer curve of an elbow of cast iron soil pipe. Finally the yoke that is connected to the lever by links is provided with a one-way pipe engaging and gripping means actuated by forces through the links to grip the pipe and prevent movement of such other yoke longitudinally of the pipe in the direction of the applied forces on the links. The yoke is also notched so that when reversed it will permit the links to extend past it without interference.

James E. Wilkerson
INVENTOR

BY Browning, Hyer,
Eickenroht & Thompson
ATTORNEYS

James E. Wilkerson
INVENTOR

BY Browning, Hyer,
Eickenroht & Thompson
ATTORNEYS

James E. Wilkerson
INVENTOR

BY Browning, Hyer,
Eickenroht & Thompson
ATTORNEYS

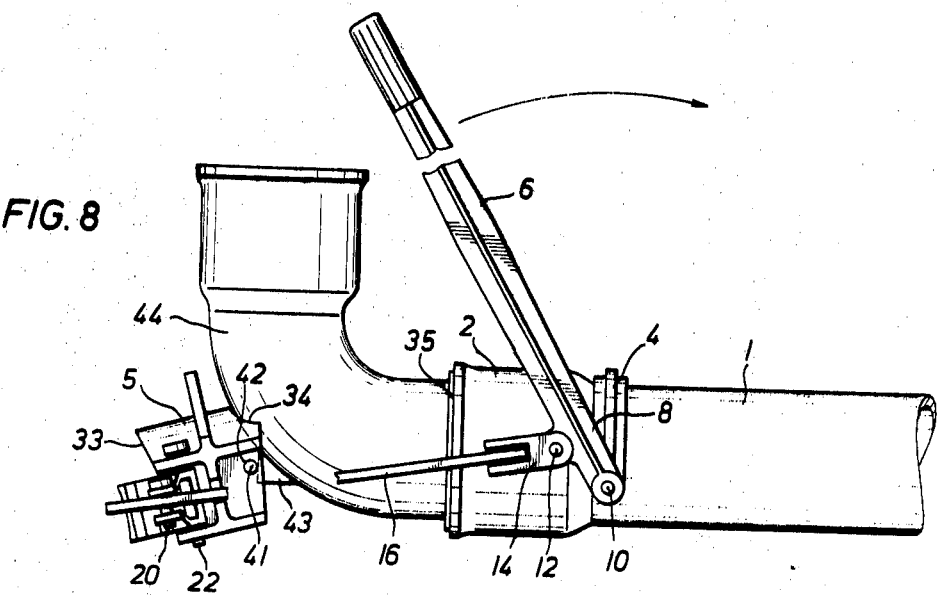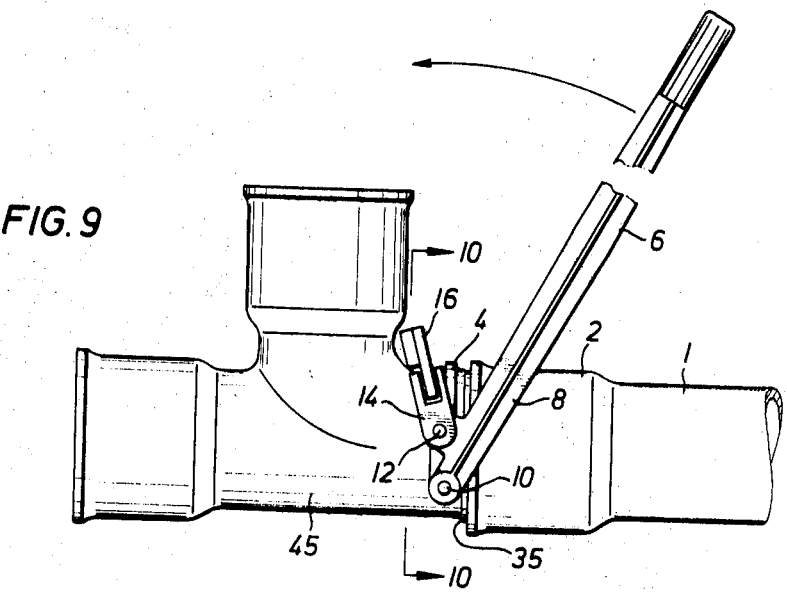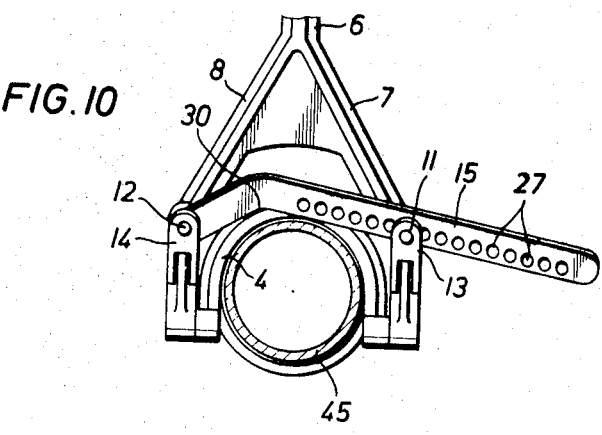

PIPE JOINT MAKE-OR-BREAK TOOL

BACKGROUND OF THE INVENTION

This invention relates to a tool for making or breaking a pipe joint of the character commonly referred to as a bell-and-spigot joint or simply as a bell-type pipe joint, in which the seal between the pipes of the joint is provided by a gasket of sleeve-type form fitting in the bell and not only providing the gasket but providing the mechanical interconnection between the two parts of the joint so as to hold them mechanically firmly together and in the desired alignment. In order for such a gasket to be tight enough not only to provide the necessary seal, but also to provide the necessary mechanical connection between the parts of the joint, it is necessary that it be very tight. As an almost inevitable result of this arrangement such a joint becomes one which is very difficult to make by forcing the pipes together with the gasket between them, or to break by pulling the pipes apart.

Prior Pat. 3,096,572, issued Jul. 9, 1963, in the name of W. A. Simmons for Pipe Joint Fabricating Tool and presently belonging to this applicant's assignee, illustrates and describes a tool for making up a joint of this character, or in other words for forcing together two pipes, one having a bell end thereon and the other having a spigot end or a plain pipe end, with an elastomer sleeve-type gasket in the bell to provide the mechanical connection above described. The tool illustrated in said patent has been used extensively and proved eminently satisfactory for the purpose of making up pipe joints. However, it has certain limitations in that it is not suitable for breaking out pipe joints, nor for either making up nor breaking out joints between straight pipe and fittings such as elbows or T's, nor in any other situation in which the nature or arrangement of the pipes and perhaps other surroundings is such that the distance between the yokes of the tool which fit over the pipe need to be different from that for which the tool was designed.

It is therefore an object of this invention to provide a tool for making up or breaking out pipe joints of the type above mentioned, to replace one suitable only for making them up.

A further object is to provide such a tool which may be employed in various places in which the distance between the two main yokes that fit over the pipe may be greatly different in one instance from in another.

Another object of this invention is to provide such a tool which is not limited in its operation to the making up of two straight sections of pipe, but which may be employed additionally or optionally for making up or breaking out joints between two sections of pipe, one or both of which may be in the form of a pipe fitting such as an elbow or a T.

Other objects and advantages of this invention will become apparent from the following description taken in connection with the accompanying drawings wherein is set forth by way of illustration and example, but not by way of limitation, one embodiment of this invention.

In the drawings:

FIG. 8 is a side elevation of the device illustrated in the previous FIGS. shown in place for assembling a joint between a straight length of pipe and an elbow.

FIG. 9 is a side elevation of the device of this invention shown assembled and mounted on a joint between a straight length of pipe and a T fitting in position for forcing the disassembly of such joint.

FIG. 10 is a fragmentary cross section taken along the line 10–10 of FIG. 9.

In order to produce a device having very considerably greater range of usefulness than the one illustrated in the aforesaid prior patent, a number of changes have been made in the creation of the present invention as compared with that device.

For example, but without limitation, the draw links of the prior device have been replaced with links having numerous openings spaced lengthwise therealong so that instead of having a fixed distance apart in which the pair of pipe engaging and anchoring yokes may be connected by said links, they may be connected in any one of a substantial number of various positions, thereby providing for the effective adjustability of the length of such links. Furthermore, the links have been made so as to act as push bars as well as draw links and a curved portion has been made into at least one such link so that it could be employed under certain circumstances where the space available is very small to act itself as one of the pipe engaging yokes. When the links are to be employed as push bars, this is accomplished by disconnecting them from one of the pipe engaging yokes most remote from the actuating lever and reversing the direction of such yoke on the pipe. In order to make this possible without interfering with such operation between the links or push bars and such yoke, appropriate notches have been formed in the yoke to accommodate the links or bars.

In order that the yoke last mentioned may be made to fit into a fitting such as an elbow or the like and thus not be limited to use on straight pipe sections, one end edge of such yoke has been made with a curved abutment surface to abut against a curved portion of such fitting. In this connection also the two legs of the yoke adjacent such curved abutment edge have been formed with opposed aligned openings to receive a pin or other abutment device adapted to engage the lug or projection which may be formed on the outer portion of the curve of an elbow fitting or the like.

The changes just mentioned are noted as examples in the present specific disclosure of the changes made in this invention in order to adapt it for expanded utility as compared with that shown in the previous patent.

Figure 1:
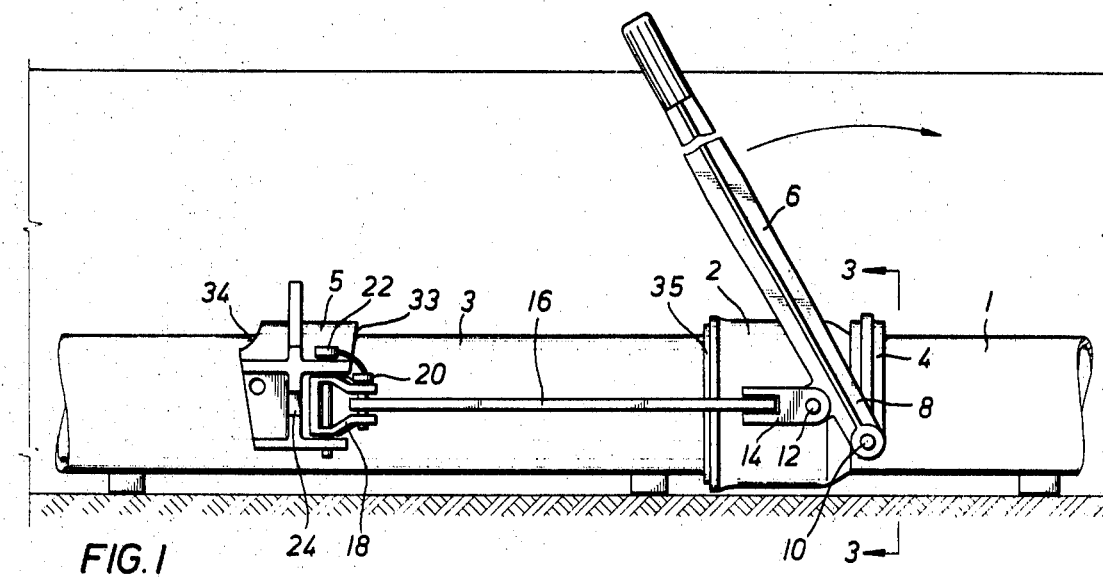
FIG. 1 is a longitudinal section through a trench formed in the earth wherein reside two lengths of pipe joined together by a bell-and-spigot type joint with the device of the present invention operably mounted over the joint, the lengths of pipe and said device being shown in elevation.

Referring more specifically to the drawings, in FIG. 1 a straight pipe 1 having a bell end 2 is shown as having been joined or as being in the process of being joined to a second straight pipe having a plain end or a spigot end, with the device of this invention in place thereon and in position for making up such joint.

This device employs a pair of pipe engaging yokes 4 and 5 which are adapted to be engaged with the respective pipes between which the joint is formed and temporarily anchored relative to such pipes against movement in one direction while being moved relative to one another by operation of the lever 6. In the case of the use of the device for making up a joint, as illustrated in FIG. 1, the yoke 4 while freely movable on and along the pipe 1 in a longitudinal direction, is temporarily anchored by engagement with the bell 2 against the movement toward the open end of the bell. At the same time, the yoke 5, while big enough to freely move along the pipe 3, will be held by a one-way pipe gripping means against movement toward the plain end of the pipe 3 which makes up the joint. Then when the device is operated to move these two yokes toward one another, they move the respective pipes toward one another to cause the makeup of the joint.

Figure 2:
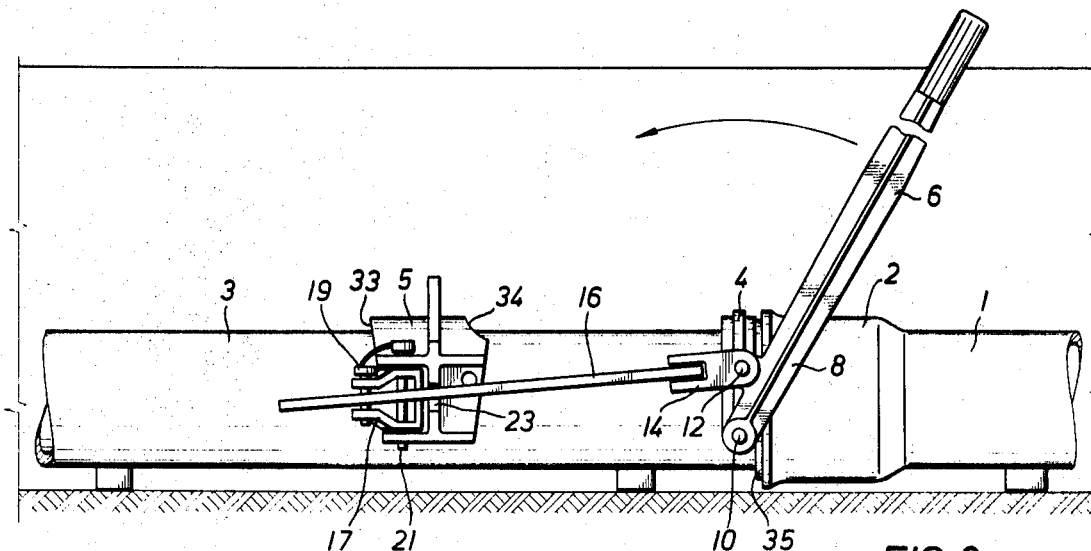
FIG. 2 is a view similar to FIG. 1 but showing the device of this invention in position for separating the two parts of the joint, just before the act of disassembly occurs.
Figure 3:
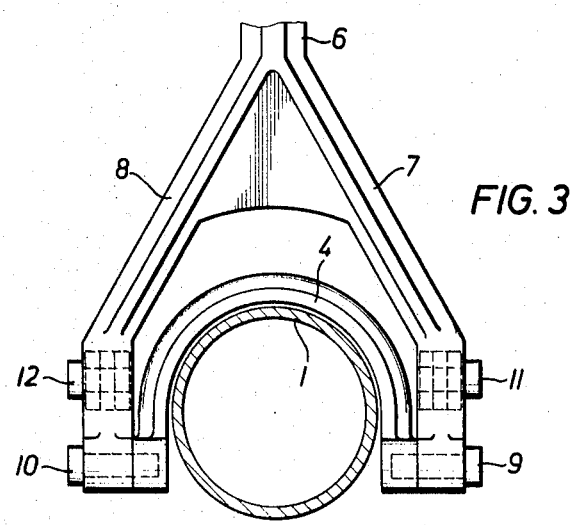
FIG. 3 is a fragmentary sectional view taken along the line 3–3 of FIG. 1.

The mechanism for moving the two pipe engaging yokes 4 and 5 toward one another includes a yoke lever 6 having a yoke portion with legs 7 and 8, as shown in FIG. 3, these legs straddling the yoke 4 and being pivotally joined to the same adjacent the lower ends of the legs of the yoke 4 by means of pivotal connections 9 and 10. Spaced from the pivotal connections 9 and 10, preferably upwardly therefrom as seen in FIGS. 1, 2 and 3, are pivotal connections 11 and 12 whereby the legs 7 and 8 are pivotally connected to clevises or links 13 and 14. The axes of the pivotal connections 11 and 12 are parallel to the axes of pivotal connections 9 and 10 and the links 13 and 14 are pivotally connected, preferably on axes at right angles to the axes of the pivotal connections 11 and 12, to pull and push bars 15 and 16 which extend toward the pipe engaging yoke 5.

Bellcrank levers 17 and 18 are shown pivotally connected by pivot pins 19 and 20, respectively, to the push and pull bars 15 and 16, on axes which may be parallel to those of the joinder of such push and pull bars to the short links 13 and 14. These bellcrank levers are pivotally mounted on the yoke 5 on opposite sides thereof by means of pivotal connections 21 and 22. It may be noted at this point that the pivotal connections 21 and 22 are readily removable and replaceable in either of several openings in the yoke 5 at varying distances from the centerline of such yoke, so that such bellcranks may be positioned closer to or further from such axis to accommodate different sizes of pipe as will presently be explained. In order to accommodate the push and pull bars 15 and 16 when the yoke 5 is reversed so that the bellcranks 18 are in positions remote from the yoke 4 as illustrated in FIG. 2, the yoke 5 is provided with notches 23 and 24 in alignment with the push and pull bars 15 and 16, so as to permit these bars to extend past the yoke 5 without interfering therewith.

The bellcranks 17 and 18 are provided with gripping jaws 25 and 26 positioned so that when swung in the direction in which they would be pulled when the links 15 and 16 are actuated to exert a pull, as shown in FIG. 1, they will engage the pipe 3 in such manner as to prevent the yoke 5 from moving in the direction of such pull. When the yoke 5 is in reverse position as shown in FIG. 2, and the push and pull bars are acting as push bars tending to move the yoke 5 away from the yoke 4, such force applied to the bellcranks with the yoke 5 reversed will tend to move the pipe gripping jaws 25 and 26 toward the pipe and engage it in such manner as to prevent the yoke 5 from moving in the direction of the push. Hence, these bellcranks 17 and 18 and associated gripping jaws 25 and 26 serve as one-way pipe gripping means for the yoke 5 to prevent it from being moved along the pipe in the direction of the force exerted by the respective push and pull links 15 and 16.

In order to provide for the effective adjustment of the length of the push and pull bars 15 and 16, each of these bars in the present structure is shown as being provided with a number of openings 27 and 28, respectively, at intervals along a major portion of its length. The pivot pins 19 and 20 being readily removable, these may be placed in any selected pair of openings 27 and 28, respectively, so as to adjust the initial positions of the yokes 4 and 5 relative to one another to whatever distance may be indicated by the nature of the pipes or fittings being joined and the surrounding structures that might have a bearing on the preferable distance.

Figure 4:
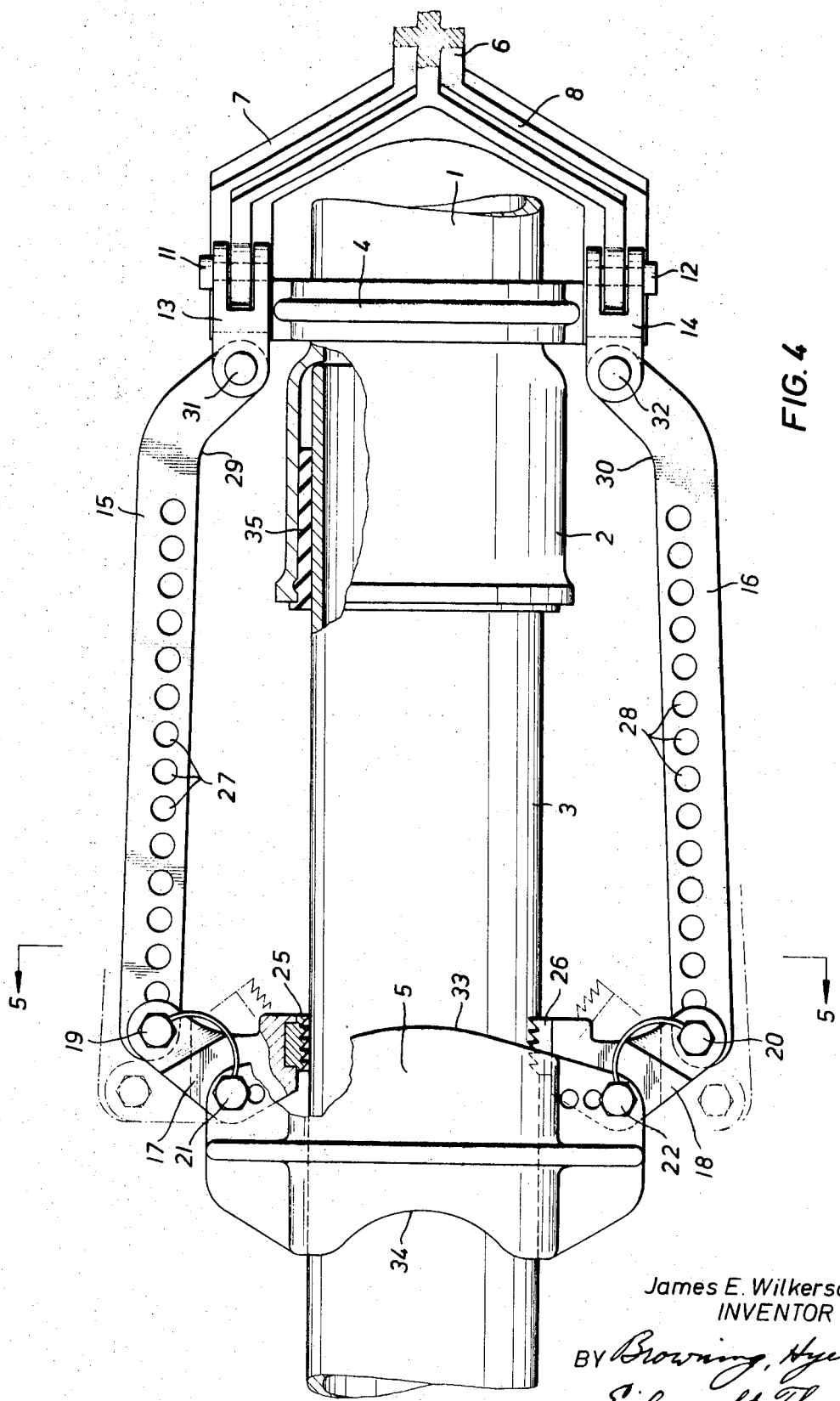
FIG. 4 is an enlarged plan view of the device and pipes shown in FIG. 1 with portions broken away and shown in section.
Figure 5:
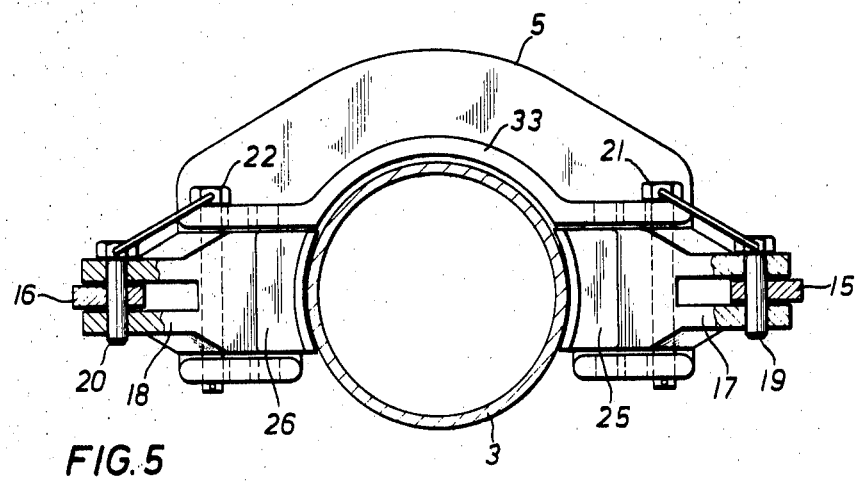
FIG. 5 is a transverse sectional view taken along the line 5–5 of FIG. 4.

By reference to FIG. 4 it will be seen that the pivotal connections 31 and 32 between the links 13 and 14, respectively, and the bars 15 and 16, respectively, are located at substantially right angles to the pivot pins 11 and 12, so that pivotal connections 12 and 32, for example, taken with the clevis 14, provide a substantially universal connection between the yoke leg 8 of the yoke lever and the push and pull bar 16. The same is true of the pivotal connections 11 and 31 and the clevis 13 with regard to the yoke leg 7 and the push and pull bar 15.

It will be noted that the respective push and pull bars 15 and 16 are curved or bent at 29 and 30. The purpose of this is to permit one or the other of these bars, in case of necessity for mounting the device for the purpose of separating a joint in an extremely short axial space along a pipe, to be extended across and pivotally connected to the clevis on the opposite side of the device and on the opposite side of the pipe, under which circumstances, as presently will be explained, the push and pull bar will itself act as and instead of the yoke 5.

It is further to be noted in FIG. 4 that one end surface 33 of the yoke provides an abutment which may be employed if desired against a plain surface, while the opposite end edge 34 is concavely curved so as to receive a curved portion of a fitting in the manner shown, for example, in FIG. 8 presently to be described.

Further, in FIG. 4 the gasket between the two pipes forming the joint is illustrated by way of example in cross section as shown at 35.

Figure 6:
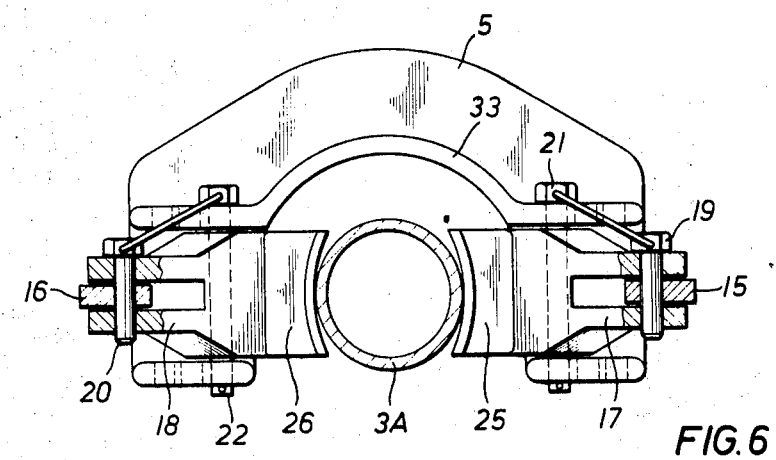
FIG. 6 is a view similar to FIG. 5 but showing the device in place on a smaller size pipe.
Figure 7:
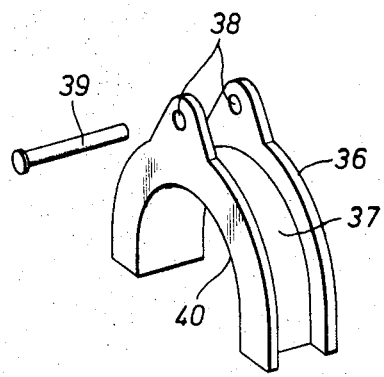
FIG. 7 is a perspective view of a sizing stirrup or yoke type of adapter used with the device of this invention for accommodating it to smaller diameters of pipe.

In FIG. 6 the yoke 5 is shown in place on a pipe 3a of smaller cross section than that illustrated in FIGS. 1 to 5, inclusive, and it will be seen that the pipe gripping jaws 25 and 26 have been readily adapted to such smaller pipe by the simple means of moving the pivot pins 21 and 22 from their positions in the outermost holes provided therefor as shown in FIG. 4 to positions closer to the central axis of the yoke 5.

In order to provide for a necessary fit of the yoke 4 upon a smaller pipe, an adapter to yoke 36 may be provided having a channel 37 in its outer surface in which to receive the yoke 4 when the yoke 36 is placed within the yoke 4. At an appropriate position the flanges on the opposite sides of the channel 37 may be extended to form ears for receiving openings 38 through which a retaining pin 39 may be placed to hold the adapter yoke 36 in place within the yoke 4. The yoke 36 adapter will be provided with an inner side opening 40 appropriate to the smaller size of pipe to be dealt with.

In essence the illustrations in FIGS. 1 through 7 have to do primarily with operations on straight pipes and the connections therebetween. It has already been mentioned that in FIG. 1 a movement of the handle or lever 6 in the direction of the arrow will place a tension on the push-pull bars 15 and 16 which will in turn swing the bellcrank levers 18 in a counterclockwise direction as seen in FIG. 4 so that the pipe gripping jaws 25 and 26 will grip the pipe and prevent the yoke 5 from being moved toward the joint. When sufficient force is placed upon the links 15 and 16 by means of the lever 6, yokes 4 and 5 will be forced toward one another and will take the respective pipes 1 and 3 with them so as to move the pipe 1 into the bell and complete the joint. If one complete swing of the lever 6 in the direction of the arrow fails to make up the joint sufficiently, the lever may be swung back in the reverse direction and the yoke 5 may be pushed if necessary in order to move it along the pipe 1 to such a degree that it will take a new position on the pipe 1 and be gripped thereto by the members 25 and 26 so as to move the pipe 1 still further into the joint. This operation may be repeated as necessary in order to completely make up the joint.

By reference to FIG. 2, it will be seen that the operation is substantially the reverse with the yoke 5 reversed in position on the pipe 3 and with the yoke 4 placed on the pipe 3 instead of on the pipe 1 but placed adjacent to the open end of the bell 2. Under these circumstances movement of the lever 6 in the direction of the arrow will place compressive force on the links or bars 15 and 16 and will move the bellcrank levers 17 and 18 in a direction to cause the pipe gripping jaws 25 and 26 to grip the pipe and prevent movement of the yoke 5 toward the left. Continued pressure and movement of the lever 6 will thereupon force these yokes apart and cause the yoke 4 to force the bell 2 toward the right relative to the pipe 3 and hence to withdraw the pipe 3 from the bell and break the joint.

The operation will be the same for the smaller sizes of pipe as illustrated in FIG. 6 with the only exception being the adjustment of the position of the pivots 21 and 22 to cause the pipe gripping jaws 25 and 26 to grip the smaller pipe, and the placement of the adapter yoke 36 within the yoke 4.

Referring now to FIG. 8 as illustrating the application of the present invention to the making up of a joint between a straight piece of pipe 1 and an elbow designated 44, in such use the pipe gripping jaws 25 and 26 are inactive, serving merely to anchor the push-pull bars 15 and 16 to the yoke 5. The curved abutment edge 34 of the yoke 5 is placed against the curved end portion of the elbow 44 and there is additionally provided an abutment in the form of a pin 41 extending through openings in the legs of the yoke 5 across such yoke, so as to abut a lug or projection 43 which is frequently formed on elbows of pipe of this type. With the two bearing points provided by the curved edge bearing surface 34 and the abutment pin 41 it will be seen that operation of the lever 6 in the direction of the arrow will apply pressure to the elbow 44 in substantially direct alignment with the straight pipe 1 and will pull the plain end of the elbow 44 into the bell 2 to make up the joint. In this manner the tool provided by this invention will very satisfactorily accomplish the object of applying and making up a joint between an elbow and a straight pipe joint. It will readily be seen that it could be as well applied between an elbow and some other fitting other than the straight pipe 1.

With reference to FIGS. 9 and 10, there is shown the application of this invention to the breaking of a joint between a T fitting 45 and a bell end 2. It is noted again that is is immaterial whether the bell end 2 is on a straight pipe 1 or on some other shape of fitting.

In this application of the invention, one of the push-pull bars 16 will be disconnected from the corresponding bellcrank 17 or 18 and the other push-pull bar 15 will be disconnected from the clevis 14, after which the push-pull bar 16 will be extended across the top of the pipe as shown in FIG. 10 and pivotally connected to one of its openings 28 and clevis 13 on the opposite side. Then it will be observed that movement of the lever 6 in the direction of the arrow in FIG. 9 will act to force the yoke 4 to the right and the bar 16 acting as a yoke to the left against the side opening of the T and thus to break the joint.

From the foregoing it will be seen that a means has been provided for the efficient carrying out and accomplishing of all of the objects sought by this invention.

I claim:

1. In a pipe joint make-and-break tool for gasket sealed bell-type joints, said tool being of the type having a pair of yokes of a size to embrace the pipe at axially space locations and slide longitudinally thereon relative to the pipe and to one another and to abut a protrusion such as a bell end on the pipe to limit such sliding relative to the part of the pipe having such protrusion, a lever yoke having its yoke ends straddling one of said first yokes and pivotally engaged therewith to move relative thereto on an axis transverse to the axis of said one first yoke and a pair of rigid links pivotally linking the respective legs of the other of said pair of yokes to the corresponding legs of said lever yoke at positions spaced along said yoke legs in one direction from the pivotal engagement thereof with said one first yoke, the improvement which comprises: one of said links being curved so that it may be pivotally connected simultaneously to both lever yoke legs and extend over a pipe embraced by said one first yoke and said lever yoke, so that said link will itself form a yoke paired with said one first yoke to be moved relative thereto by operation of said lever.

2. In a pipe joint make-and-break tool for gasket sealed bell-type joints, said tool being of the type having a pair of yokes of a size to embrace the pipe at axially spaced locations and slide longitudinally thereon relative to the pipe and to one another and to abut a protrusion such as a bell end on the pipe to limit such sliding relative to the part of the pipe having such protrusion, a lever yoke having its yoke ends straddling one of said first yokes and pivotally engaged therewith to move relative thereto on an axis transverse to the axis of said one first yoke and a pair of rigid links pivotally linking the respective legs of the other of said pair of yokes to the corresponding legs of said lever yoke at positions spaced along said yoke legs in one direction from the pivotal engagement thereof with said one first yoke, the improvement which comprises: the other of said pair of yokes having one end surface curved to receive and bear against a curved surface on a pipe to transmit forces thereto and another end surface on its opposite end formed to receive and bear against a substantially flat surface on a pipe to transmit forces thereto, and the pivotal connections on said links being selectively engageable to said other yoke to project in a selected direction therefrom so that either of said end surfaces desired can be presented toward said one first yoke.

3. In a pipe joint make-and-break tool for gasket sealed bell-type joints, said tool being of the type having a pair of yokes of a size to embrace the pipe at axially spaced locations and slide longitudinally thereon relative to the pipe and to one another and to abut a protrusion such as a bell end on the pipe to limit such sliding relative to the part of the pipe having such protrusion, a lever yoke having its yoke ends straddling one of said first yokes and pivotally engaged therewith to move relative thereto on an axis transverse to the axis of said one first yoke and a pair of rigid links pivotally linking the respective legs of the other of said pair of yokes to the corresponding legs of said lever yoke at positions spaced along said yoke legs in one direction from the pivotal engagement thereof with said one first yoke, the improvement which comprises: the other of said yokes having one end surface formed to receive and bear against a curved surface on the outside of the curve of a pipe elbow and a pair of abutment mounting parts on its opposite legs, and an abutment mounted thereon and extending across said other of said yokes to engage a lug integral with such pipe elbow while said one end surface is bearing against the curved surface on said elbow.

4. In a pipe joint make-and-break tool for gasket sealed bell-type joints, said tool being of the type having a pair of yokes of a size to embrace the pipe at axially spaced locations and slide longitudinally thereon relative to the pipe and to one another and to abut a protrusion such as a bell end on the pipe to limit such sliding relative to the part of the pipe having such protrusion, a lever yoke having its yoke ends straddling one of said first yokes and pivotally engaged therewith to move relative thereto on an axis transverse to the axis of said one first yoke and a pair of rigid links pivotally linking the respective legs of the other of said pair of yokes to the corresponding legs of said lever yoke at positions spaced along said yoke legs in one direction from the pivotal engagement thereof with said one first yoke, the improvement which comprises: said other yoke of said pair having notches in its outer periphery in alignment with said links whereby said links may be so adjusted relative to said other yoke that said links may extend past said other yoke without interference.